United States Patent [19]

Dille et al.

[11] 4,029,424
[45] June 14, 1977

[54] INTERNAL FISHING ROD FERRULE

[75] Inventors: William A. Dille, Maplewood; Wayne E. Erickson, St. Paul, both of Minn.

[73] Assignee: Minnesota Mining and Manufacturing Company, St. Paul, Minn.

[22] Filed: Nov. 1, 1976

[21] Appl. No.: 737,331

[52] U.S. Cl. .............................. 403/292; 43/18 R
[51] Int. Cl.² .......................................... F16B 7/00
[58]* Field of Search .......... 403/292, 293, 297, 298, 403/280; 43/18 R, 18 GF

[56] References Cited

UNITED STATES PATENTS

| 1,441,045 | 1/1923 | Tredwell | 43/18 R |
| 3,048,432 | 8/1962 | Harter | 43/18 R X |
| 3,759,623 | 9/1973 | Hesse | 403/298 |

FOREIGN PATENTS OR APPLICATIONS 1,418,258  10/1965  France ................. 43/18 R Primary Examiner—Andrew V. Kundrat
Attorney, Agent, or Firm—Cruzan Alexander; Donald M. Sell; Terryl K. Qualey

[57] ABSTRACT

A fishing rod ferrule in which the male and female elements fit within the bore of the adjacent ends of the rod blank. The male element has a cylindrical end fitting within the hollow cylindrical female element and engaging spring fingers formed in the female element. The male element also has an external tapered surface to engage an internally tapered surface on the female element to provide a second point of engagement between the male and female elements, both points of engagement being readily disengageable.

1 Claim, 4 Drawing Figures

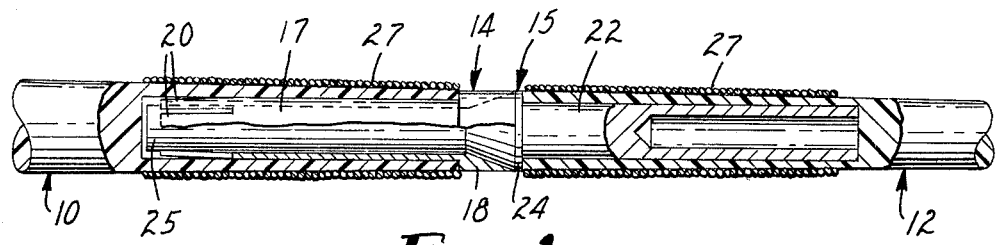
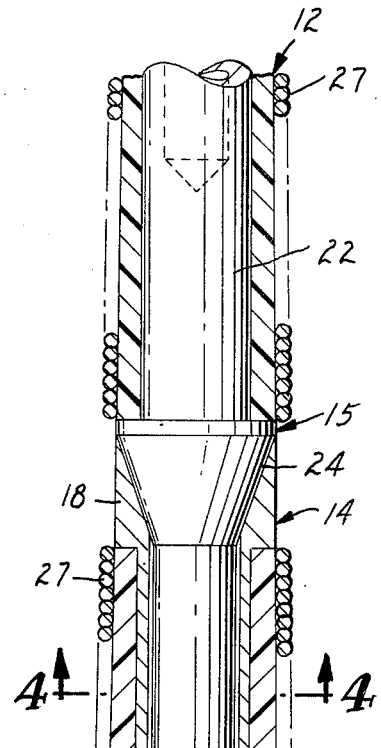
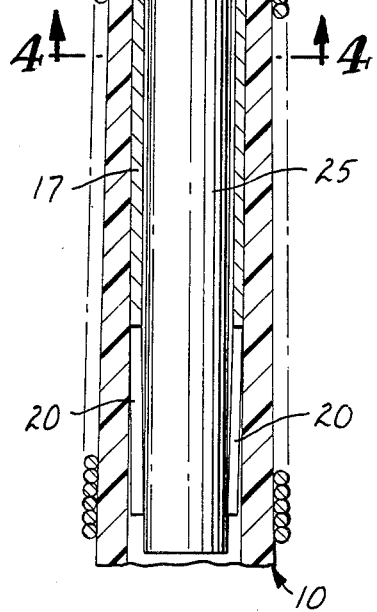
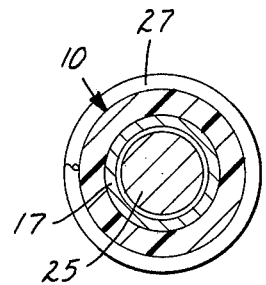
Fig. 1
Fig. 2
Fig. 3
Fig. 4

INTERNAL FISHING ROD FERRULE

FIELD OF THE INVENTION

The present invention relates to a fishing rod ferrule for joining adjacent ends of a rod blank.

BACKGROUND OF THE INVENTION

Nearly all of the fishing rods sold today are made from fiberglass reinforced plastic, generally referred to simply as fiberglass rods, or the recently introduced graphite fiber reinforced plastic, generally referred to simply as graphite rods. Most of these rods are tapered, tubular, and hollow. Variations in the action of the rod are achieved by differences in the diameter of the tube and of the wall thickness. And, nearly all rods are made of more than one piece for ease of storage and transport. The fiberglass or graphite reinforced plastice tube is called a rod blank. The rod blank is cut into the desired number of pieces and fitted with a ferrule at the cut ends to removably join the ends when it is desired to use the rod. The majority of rods are made of two pieces, the smaller diameter portion being called the tip section and the larger diameter portion being called the butt section, the two sections in use being joined by a ferrule.

There are four types of ferrules in general use — the metal ferrule, the blank-over-blank ferrule, the solid fiber-reinforced plastic ferrule, and the tubular, fiber-reinforced ferrule. The metal ferrule consists of friction fit mating male and female metal portions which are bonded to the adjacent ends of the butt and tip sections in a two-piece rod. The blank-over-blank ferrule requires two rod blanks that have matching tapers at the ends that are to fit together. The solid fiber-reinforced ferrule consists of a short tapered tubular fiber-reinforced portion that is bonded into the end of the butt section and fits into the large end of the tip section. The tubular, fiber-reinforced ferrule usually consists of a tapered, tubular, fiber-reinforced portion bonded onto the large end of the tip section into which the butt section fits, but may also be formed at the end of the tip section during the formation of the tip section. Each of these types of ferrules require a friction fit between male and female mating parts. This, of course, requires close tolerance manufacturing and the connection becomes less effective as the parts wear. Moreover, particularly in the case of the friction fit metal ferrules now in use, even if proper tolerances are maintained in manufacture, small amounts of sand or dirt between the mating surfaces may make it very difficult to separate the rod pieces at the ferrule without applying a force which can damage other parts of the rod. Finally, the external metal and fiber-reinforced ferrules now in use create a bulge in the rod which may be aesthetically displeasing as well as providing a raised surface across which the line may drag and reduce the length of the fisherman's cast.

SUMMARY OF THE INVENTION

The present invention provides an internal fishing rod ferrule comprising a female element and a male element both formed of a metal having a tensile strength of at least 7,000 kilograms per square centimeter, (100,00 pounds per square inch) at 2% yield. The female element has a hollow generally cylindrical body with an external diameter to fit within a rod blank and it has a larger diameter cylindrical end to abut the free end of the rod blank, the larger diameter end being internally tapered from the internal diameter of the body outward to its free end. The free end of the female element body to slit longitudinally to define a plurality of spring fingers, the ends of the spring fingers being offset radially inward of the body. The male element has a cylindrical body to fit within a rod blank, a larger diameter central portion to abut the free end of the rod blank and a cylindrical engaging end having a diameter slightly less than the internal diameter of the female element body for engagement only by the spring fingers of the female element body. The male central portion is externally tapered from the male body to the diameter of the engaging end at a taper complementary to the internal taper of the larger diameter end of the female element.

THE DRAWING

In the drawing:

FIG. 1 is a longitudinal view, partially in cross section, of an internal ferrule constructed in accordance with the present invention in use in a fishing rod;

FIG. 2 is a longitudinal view, partially in cross section, illustrating the male element being inserted into the female element of the ferrule;

FIG. 3 is a longitudinal view, partially in cross section, illustrating the male element fully inserted into the female element of the ferrule; and FIG. 4 is a cross section view taken along line 4—4 of FIG. 3.

The internal ferrule of the present invention is illustrated in use in joining the butt section 10 and tip section 12 of a two-piece hollow tapered fiber-reinforced plastic rod. The ferrule of the present invention may be used in a fly rod, a bait-casting rod or a spinning rod. The rod also may consist of more than two pieces in which case the ferrule of the present invention may be used at each juncture of the rod; a two-piece rod being referred to herein simply for convenience of terminology.

The ferrule consists of a female element 14 and a male element 15. Both elements are formed of a metal having a tensile strength of at least 7,000 kilograms per square centimeter (100,000 pounds per square inch) at 2% yield which has been found to be the necessary tensile strength for a practical light-weight internal ferrule. Metal alloys such as drill rod steel, stressproof steel, copper beryllium alloys and high carbon stainless steels (e.g. number 416) are classes of materials which include the high strength materials necessary. Since the ferrule must also be corrosion resistant, the metal chosen must itself be corrosion resistant (e.g., stainless steel) or it must be plated with a corrosion resistant metal such as chromium or nickel.

The female element 14 has a hollow generally cylindrical body 17 with an external diameter to fit within the butt section 10 of the rod blank. The larger diameter end 18 is internally tapered from the internal diameter of the body 17 outward to its free end.

The free end of the body 17 is slit longitudinally to define a plurality of spring fingers 20, the spring fingers 20 having their free ends offset radially inward.

The male element 15 has a cylindrical body 22 to fit within the tip section of the rod blank, a larger diameter central portion 24 to abut the free end of the rod blank and a cylindrical engaging end 25 having a diameter slightly less than the internal diameter of the female element body 17 for engagement only by the spring fingers 20 of the female element body 17. The central portion 24 of the male element 15 is externally tapered from its larger diameter adjacent the male body 22 to the diameter of the engaging end at a taper complementary to the internal taper of the larger diameter end 18 of the female element 14. The male body 22, in the illustrated embodiment, is partially drilled out from its free end to reduce the overall weight of the ferrule to a minumum and to assist in matching the flexibility of the rod blank.

Thread wrap 27 is applied to the exterior of the mating ends of the butt and tip sections 10 and 12 of the rod over the ferrule to strengthen the mating ends and for appearance.

In use, when it is desired to assemble the butt section 10 and tip section 12 so that the rod may be used, the cylindrical engaging end 25 of the male element 15 is inserted into the female body 17 as illustrated in FIG. 2. The butt section 10 and tip section 12 are pushed together until the taper on the male central portion 24 contacts the complementary internal taper of the female end 18 while the male engaging end 26 engages and passes slightly beyond the end of the female body spring fingers 20. The areas of engagement between the female element 14 and the male element 15 are thus along their tapered surfaces in the female end 18 and the male central portion 24 and at the engagement between the female body spring fingers 20 and the male cylindrical engaging end 25. The engagement between the female spring fingers 20 and the male cylindrical engaging end 25 provide sufficient force to hold the rod butt section 10 and tip section 12 together during normal use. The limitation of engagement to the areas along the spring fingers and at the complementary tapers assures that the parts will not lock up even if sand or dirt get into them. Any wearing along the tapered engaging surfaces simply permits deeper engagement between the parts and will not degrade the connection.

In one specific embodiment, a fishing rod ferrule constructed in accordance with the present invention was made from stainless steel No. 5, type 416. The female body 17 had an external diameter of 0.38 centimeter (0.15 inch), an internal diameter of 0.32 centimeter (0.126 inch) and an overall length of 2.5 centimeters (1.0 inch). The female body spring fingers 20 were made 0.64 centimeter (0.25 inch) long with a 0.05 centimeter (0.02 inch) slit between adjacent fingers. The cylindrical female end 18 was formed 0.475 centimter (0.187 inch) long with an internal taper angle of 20° from the female element axis. The male element 15 was formed with an overall length of 6.03 centimeters (2.375 inches), the male body 22 being 2.857 centimeters (1.125 inches) long and the cylindrical engaging end 25 being 2.86 centimeters (1.126 inches) long. The external diameter of the male body 22 was 0.327 centimeter (0.129 inch) and that of the cylindrical engaging end 25 was 0.319 centimeter (0.1255 inch) with a maximum diameter at the male central portio 24 of 0.52 centimeter (0.205 inch) over a length of 0.038 centimeter (0.015 inch). This particular ferrule was designed for use in a two-piece 2.4 meter (8 foot) long fly fishing rod.

We claim:
1. An internal fishing rod ferrule comprising:
a female element formed of a metal having a tensile strength of at least seven thousand kilograms per square centimeter at two percent yield, said female element having a hollow generally cylindrical body with an external diameter to fit within a rod blank and having a larger diameter cylindrical end to abut the free end of the rod blank, said larger diameter end being internally tapered from the internal diameter of said body outward to one free end, the other free end of said body being slit longitudinally to define a plurality of spring fingers, said spring fingers having their free ends offset radially inward,
a male element formed of a metal having a tensile strength of at least seven thousand kilograms per square centimeter at two percent yield, said male element having a cylindrical body to fit within a rod blank, a larger diameter central portion to abut the free end of the rod blank and a cylindrical engaging end having a diameter slightly less than the internal diameter of said female element body for engagement only by said spring fingers of said female element body, said male central portion being externally tapered from said male body to the diameter of said engaging end at a taper complementary to said internal taper of said larger diameter end of said female element.

* * * * *